United States Patent [19]
Plattner

[11] Patent Number: 5,718,216
[45] Date of Patent: Feb. 17, 1998

[54] CLOSURE FOR SAW CABLES

[76] Inventor: Josef Plattner, Gattern 34d, Gallzein, A-6200 Jenbach, Austria

[21] Appl. No.: 424,428

[22] PCT Filed: Aug. 10, 1994

[86] PCT No.: PCT/IB94/00245

§ 371 Date: May 24, 1996

§ 102(e) Date: May 24, 1996

[87] PCT Pub. No.: WO95/05914

PCT Pub. Date: Mar. 2, 1995

[30] Foreign Application Priority Data

Aug. 23, 1993 [AT] Austria .................................. 1693/93

[51] Int. Cl.$^6$ .................................................. B28D 1/08
[52] U.S. Cl. .............. 125/21; 451/296; 451/298; 451/309
[58] Field of Search ................ 125/12, 21; 451/298, 451/309, 296

[56] References Cited

U.S. PATENT DOCUMENTS

| | | | |
|---|---|---|---|
| 3,884,212 | 5/1975 | Armstrong et al. | 125/21 |
| 4,015,931 | 4/1977 | Thakur | 125/21 |
| 4,907,564 | 3/1990 | Sowa et al. | 125/21 |
| 5,080,086 | 1/1992 | Tomlinson et al. | 125/21 |
| 5,086,751 | 2/1992 | Pfister et al. | 125/21 |
| 5,216,999 | 6/1993 | Han | 125/21 |
| 5,377,659 | 1/1995 | Tank et al. | 125/21 |

FOREIGN PATENT DOCUMENTS

| | | |
|---|---|---|
| 413530 | 5/1910 | France . |
| 1357117 | 2/1964 | France . |
| 2574512 | 12/1984 | France . |
| 1241951 | 8/1968 | United Kingdom . |
| 489357 | 11/1991 | United Kingdom . |

OTHER PUBLICATIONS

Copy of International Preliminary Examination Report for PCT/IB94/00245 dated May. 5, 1995.

Copy of International Search Report for PCT/IB94/00245 dated Nov. 3, 1994.

*Primary Examiner*—Eileen Morgan
*Attorney, Agent, or Firm*—Rankin, Hill, Lewis & Clark

[57] ABSTRACT

The cutting wire consists of a wire rope (4) with cutting beads (6) affixed thereto that contain bonded superabrasives such as diamond and a cutting wire connector which connects the cutting wire to produce an endless wire loop for use in a wire sawing machine. The cutting wire connector consists of a double joint which has two joint axes intersecting each other at an angle of 90°. The cutting wire connector consists of two forks (1) at the wire ends (4), an intermediate part (2) and two joint pins (3) which connect each form (1) with the intermediate part (2) in such a way that the connection can be opened easily. The cutting wire connected by means of the joint connector has a long service life while exhibiting increased cutting performance and increased utilization of the operating time of the facilities.

8 Claims, 5 Drawing Sheets

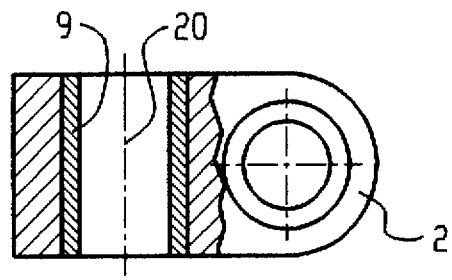
Fig. 5
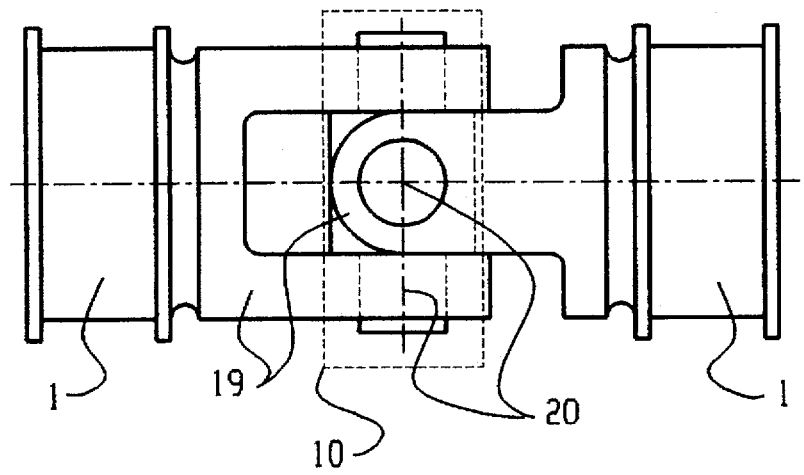
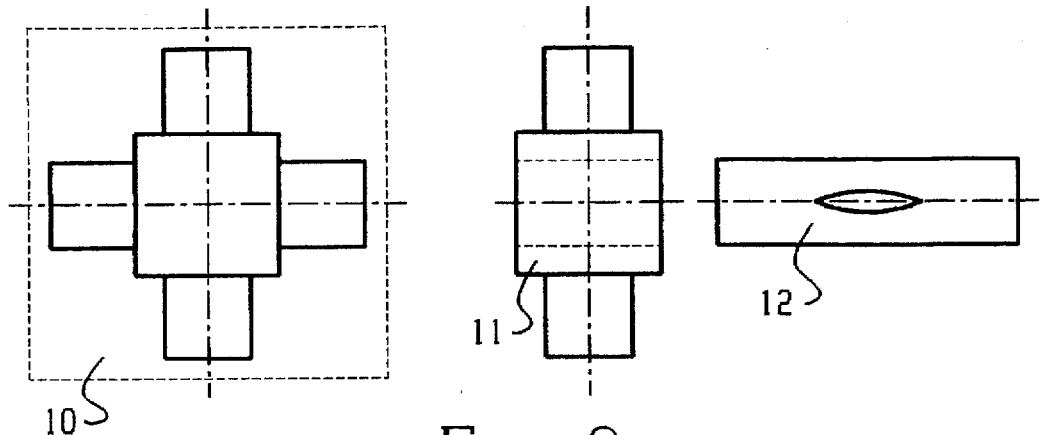
Fig. 6

CLOSURE FOR SAW CABLES

The invention relates to a cutting wire used as a tool for a wire sawing machine employed to cut metallic and especially mineral materials, such as concrete, natural stone and the like by means of a steel rope consisting of several wire strands. On said steel rope, cutting beads containing preferably metal-bonded superabrasives are spaced at predetermined intervals, and the wire ends of one or more wire lengths are connected by means of a connection mechanism.

At least one connecting mechanism is necessary if the cutting wire is to be employed on a wire sawing machine, especially when a closed wire loop is used. It is possible to connect several wire lengths to form a closed wire loop, which means that several connecting mechanisms can be present in one tool, for instance when a wire breaks and is reconnected.

According to the present state of the art, there are different methods of connecting the ends of wire saws:

A method of connecting wire ends known in the prior art is splicing. This method of connecting the wire ends of a cutting wire fitted with diamond cutting beads is disclosed in EP 160625A2. The splicing together of wire ropes cannot be regarded as a method for connecting cutting wire ends that can be accomplished sufficiently easily, securely or precisely. For this reason, this method is mainly used on stationary facilities.

Spliced cutting wires cannot be used for producing internal contours. Normally, the repair of spliced cutting wires cannot be carried out on site; instead, the wire has to be sent to the manufacturer's plant and must be repaired there.

U.S. Pat. No. 3,100,323 discloses a cable coupler with the cable ends being equipped with ferrules which are received in a connecting sleeve via a lateral opening. Thus, a connection is created which can be uncoupled easily. Since this patent describes round ferrules in a round seat of the connecting sleeve, this design is hardly suitable for cutting wires used in wire sawing machines, since torque cannot be transmitted along the longitudinal axis of the wire.

A wire saw coupling of a similar functional design is disclosed in U.S. Pat. No. 2,036,172 and CH patent No. 15168. Neither of the inventions allow the transmission of torque along the wire axis.

CH Patent No. 85444 discloses a connection for transmission belts which provides a connection of the two wire ends by means of the lateral introduction of a ball head into the seat of the connection sleeve. Here, the possibility of transmitting torque along the axis of the wire is ensured by means of a web between the ball head and the end of the wire along the neck. Still, this solution is not suitable for applications using cutting wires, since the bending moments which occur when the cutting wire connector passes through the rolls or pulleys of the wire sawing machine may gradually open up the corresponding seat of the second wire end, and the ball head may be pulled out.

European Patent No. 3,179,65A2 discloses a screw connection for connecting wire ends. The last cutting bead on each wire end is equipped with a threaded projection in which the wire ends are anchored. A threaded sleeve is screwed on to both threaded projections.

Great Britain Patent No. 884,473 also discloses a screw connection.

European Patent No. 4,142,80A2 discloses a screw connection for cutting wires, whereby careful selection of the thread lengths allows advantageous connecting and separating of the two wire ends. Additionally, a method for preventing the wire from becoming twisted in the head area of the two wire ends is provided. This is accomplished by means of a transverse rib engaging a slot. In addition to providing protection against wire twisting, this transverse rib would be suitable to ensure the transmission of torque as required by the state of the art described in the documents above.

A common disadvantage of cutting wire connectors based on clamping sleeves or threaded sleeves is their rigidity regarding bending, which leads to concave abrasive wear of the sleeves. This causes a reduced diameter in the middle of such sleeves which can lead to premature failure of the cutting wire.

Practical applications that correspond to the state of the art of wire sawing technology with tools containing diamond are rigid in the area of the connectors and do not permit bending. This means that extremely highreversed bending stresses are transmitted on to the wire cable adjacent to the connection sleeves on both sides of the cutting wire connector. Additionally, this reversed bending stress is superimposed by tensile forces and torque around the wire axis. Wires are not sufficiently able to withstand these complex stresses and break prematurely. The wire areas susceptible to breakage should at least have a life as long as that of the cutting beads.

Therefore, the object of the present invention is to develop a method for connecting cutting wires which should meet the following basic requirements:

high wear resistance against abraded particles and when passing over workpiece edges;

sufficient transmission of tensile forces;

possibility to transmit torque along the wire axis;

security against the wire coming apart unintentionally;

quick and repeatable connection and separation of the wire ends for repairing the tool or changing it, as is necessary for machining internal contours; and increased fatigue strength under reversed bending stresses.

This object of the invention is reached by means of a cutting wire connection with a double joint, with the wire ends to be connected being equipped with a fork-shaped part. The connection of the forks is made by means of an intermediate part which is connected with each fork by means of a joint pin so that the connection can be rotated. The geometric axes of the joint pins in the intermediate part intersect at an angle of 90° and have a distance from each other that preferably corresponds to the diameter of the cutting beads.

One embodiment of the invention has a universal joint spider as the intermediate part whereby the rectangular joint axes become placed in the same geometric plane.

According to the invention, the joint connection between the left-sided or right-sided fork and the intermediate part by means of joint pins can be designed in different ways, not all of which are illustrated.

The joint pin can be designed as a grooved pin, screw bolt, dowel pin, collar pin, conical pin and the like or can be constructed as a combination of several of the abovementioned designs.

The invention provides that the cutting wire connection can be opened and closed repeatedly, quickly and without problems even on site, without having to set up heavy devices, which are prone to accidents, for cutting off the basic wire and refastening the connector components, as is required by the present state of the art. This is easily done by removing and reinserting one of the two joint pins, with the additional advantage that the loss of parts of the expensive diamond tool is avoided.

When choosing a construction form for the joint pin according to the present invention, the only aspect that has to be taken into consideration is that after mounting the joint pin must be secured against axial shifting.

A preferred measure to secure the joint pin is to rivet it on one side by means of a center punch or rivet pliers, with the opposite end of the joint pin being shaped conically and fitting into a corresponding shaped hole at the side of the fork. This produces a positive connection with the forks, while the possibility of rotation around the joint axes is provided inside the bore of the intermediate part.

This construction has proven successful, not the least because of its low susceptibility to being damaged by coolants containing abraded material. The invention also provides protection against axial shifting when the fixed bearing is moved into the intermediate part of the movable bearing into the two forks. One embodiment according to this principle uses a grooved pin as the joint pin, with one or more grooves engaging in the area of the intermediate part and the possibility of rotation being provided in the fork.

In accordance with the above-mentioned embodiments of joint pins and their combination according to the present invention, the only thing which always has to be provided is a corresponding, in most cases standardized and available, means of securing the joint pin against axial shift after it has been mounted. For collar pins, dowel pins and the like, retaining pins, Seeger retaining rings, spot welding and the like, and for screw bolts, adhesive bonding can be used to secure the joint pin.

All embodiments of the invention can be further developed to employ rings or sleeves in axial or radial designs consisting of material that reduces wear and/or facilitates lubrication between the movable parts of the cutting wire connector.

Subsequently, embodiments of the invention and comparative tests will be described and illustrated by drawings:

FIG. 5 shows an embodiment of the intermediate part with a sleeve (9) according to the invention.

FIG. 6 shows an embodiment of a cutting wire connector according to the invention, with a universal joint spider (10) as the intermediate part.

Figure 1:
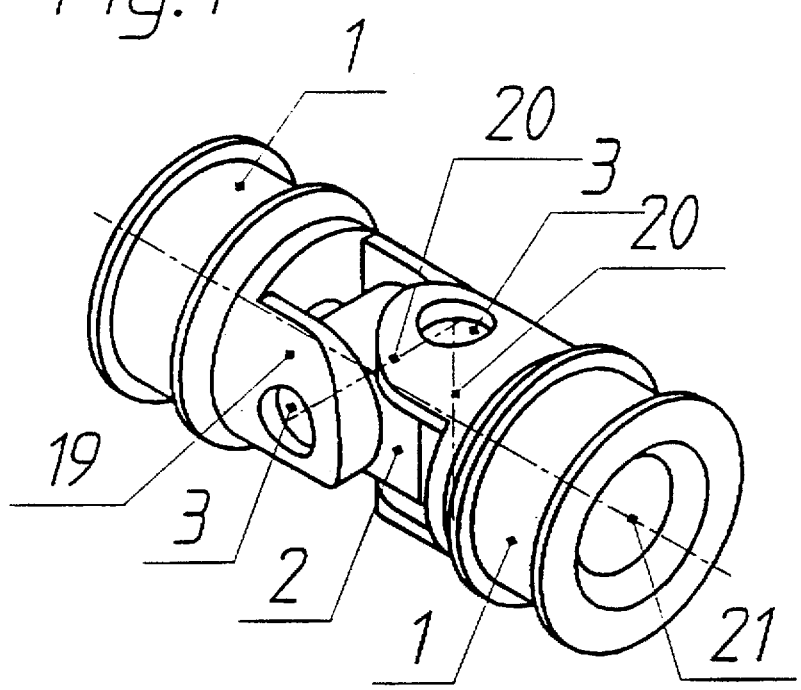
FIG. 1 shows an axonometric representation of a cutting wire connector according to the invention.
Figure 2:
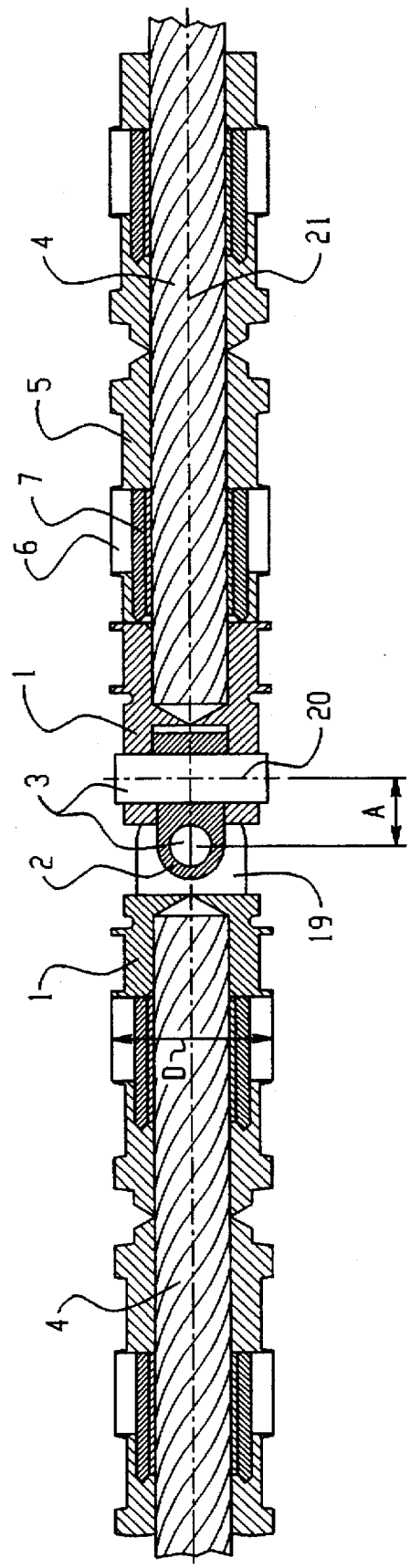
FIG. 2 shows the cross-section of a cutting wire connector according to the invention as mounted ready to be used.

In FIGS. 1 and 2 the cutting wire connector is shown in principle. It consists of a left-sided and a right-sided fork (1) which form the end of the respective basic wire (4), joint pins (3) engaging the corresponding recesses (13) of the sides of each fork (1), and an intermediate part (2) enclosing the two joint pins between the sides (19) of the two forks in such a way that rotation is possible.

The geometric axes (20) of the two joint pins (3) intersect at a right angle at a distance (A) preferably being 0.8 to 1.2 times the diameter (D) of the cutting beads. By means of crimp-type sleeves the parts of the joint (1) are crimped on to the end of the basic wire in the usual way.

Figure 3:
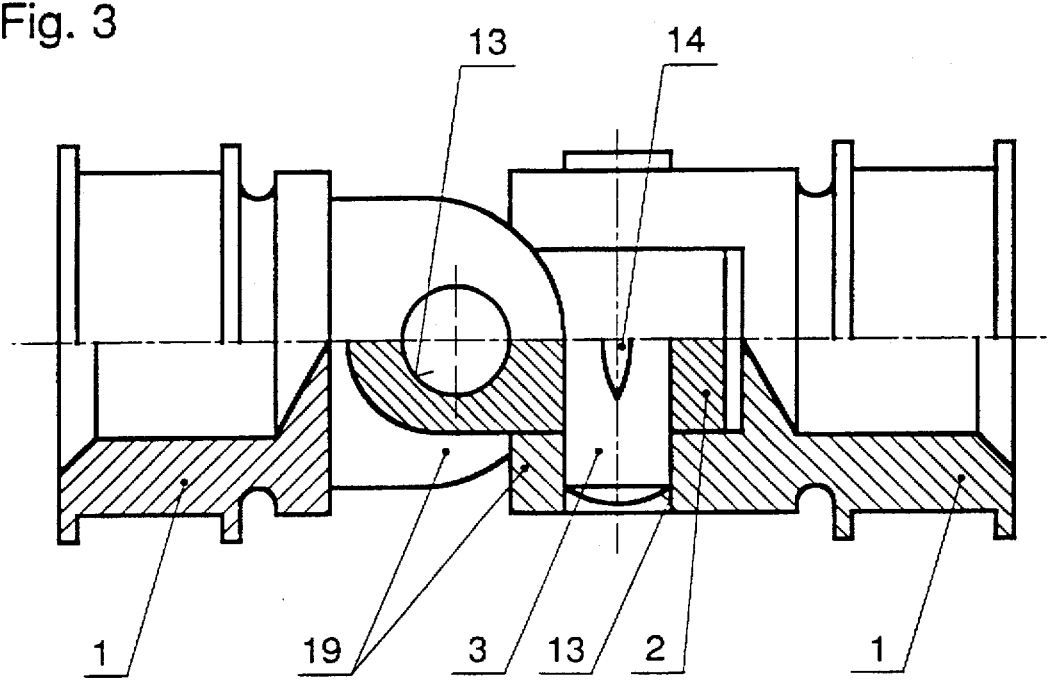
FIG. 3 shows an embodiment of a cutting wire connector according to the invention, with the joint pin (3) constructed as a grooved pin.

FIG. 3 shows how the joint pin (3) is secured in its middle position in relation to the intermediate part (2) by means of one or more grooves (14), whereby a friction-type connection is produced between the joint pins (3) and the intermediate part (2). The forks (1) can freely rotate around the joint pins (3) which are positioned at an angle of 90° to each other and which are positioned in the recesses (13). In this embodiment, a standardized component such as a grooved straight pin according to DIN 1475 is preferably used.

Figure 4:
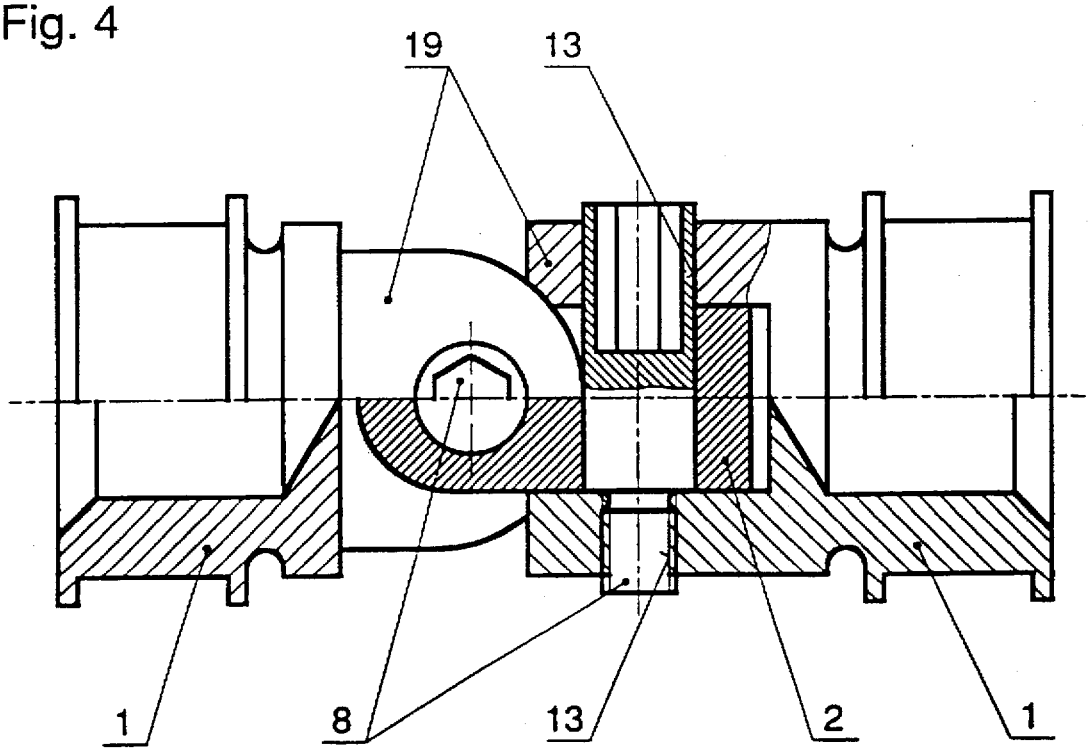
FIG. 4 shows an embodiment of the joint connector of the cutting wire according to the invention, with the joint pins being constructed as threaded bolts (8).

FIG. 4 shows an embodiment with screw bolts (8) as joint pins. In this embodiment easy and repeatable connection and separation as one of the objects of the invention is solved in a particularly advantageous way. A screw bolt (8) engages one side (9) of the connector (1) with a thread and the opposite side (19) with a cylindrical hole, whereby a hexagon socket is provided in the cylindrical area to make it possible to use a tool to fasten the bolt against one of the sides. As security against the bolt becoming loose unintentionally, punching and/or gluing the thread is possible, although this is not shown in the drawing.

FIG. 5 shows the embodiment of an intermediate part (2) according to the invention with a sleeve (9) provided in the bores for the two joint pins (3). The sleeve is to ensure wear reduction between joint pin and intermediate part during slewing motion caused by the movement of the cutting wire. Materials for the sleeve (9), preferably containing lubricants, are well-known in the prior art. What is not shown in the drawing is an example of a wear-reducing element, designed as a ring between the side (19) of the fork (1) and the intermediate part (2), whereby a conventional O-ring can be used.

FIG. 6 shows an embodiment of a wire saw connector according to the invention with a universal joint spider (10) as a special case of an intermediate part. In the universal joint spider (10) the rotation axes that intersect at a right angle lie in the same geometric plane. In comparison with embodiments where the intersecting joint axes are spaced at a distance (A), this embodiment needs more space to mount the universal joint spider (10). This is possible because the universal joint spider (10) can be shifted in a transverse direction in the area between the sides (19) and the fork (1).

In test facilities, cutting wire connectors according to the present state of the art were compared with a joint connector according to the present invention. In this test, the following types of connectors were used:

Connector No. 1: Steel screw connector with angular bevel Material ETG 25

Connector No. 2: Steel screw connector with round bevel Material ETG 25

Connector No. 3: Steel screw connector with angular bevel Material C 35

Connector No. 4: Steel clamping sleeve connector with angular bevel Material C 25

Connector No. 5: Short copper clamping sleeve connector with angular bevel Material E-Cu-F25

Connector No. 6: Long copper clamping sleeve connector with angular bevel Material E-Cu-F25

Connector No. 7: Joint connector according to the present invention as shown in FIG. 1 and FIG. 2

The test was run at a rotational speed of 20 m/s and a wire tension of 350N.

Figure 7:
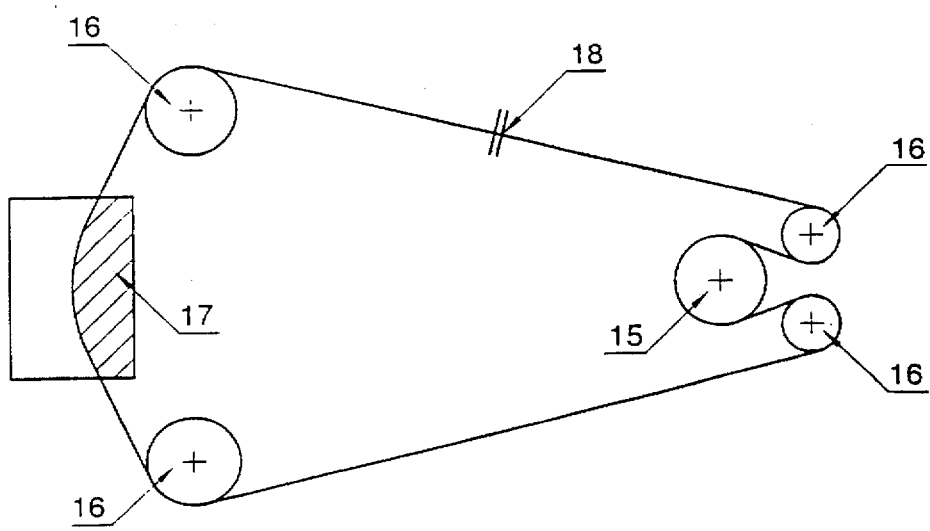
FIG. 7 shows the principle of a testing stand for cutting wire connectors.

FIG. 7 shows a schematic representation of the test setup. In order to be able to determine the influence of the design of the connection on the fatigue strength under reversed bending stresses without interference, the test was run with one cutting wire without actually machining the workpiece (17).

Figure 8:
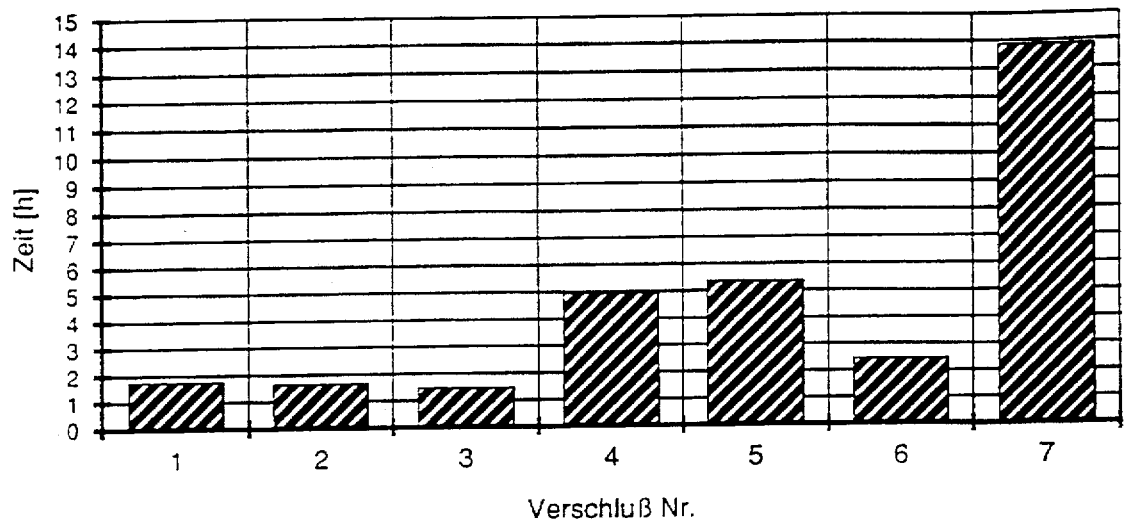
FIG. 8 shows a graphical comparison of different types of cutting wire connectors in terms of their service life.

FIG. 8 shows a bar chart of the service life in hours that could be ascertained in this test. The top value of approximately fourteen hours was accomplished by the joint connector according to the present invention. Accordingly, two joint parts intersecting at an angle of 90° ensure the bending of the joint in all directions, the transmission of extremely high tensile forces and the transmission of intended and unintended torque around the wire axis in a hitherto unknown advantageous way. Wire breakage close to the wire end pieces (i.e., forks (1) according to the embodiment of the invention) was avoided.

With the joint connector for cutting wires according to the present invention all of the following requirements made on connectors for cutting wires can be met:

1. The much-feared wire breakage in the proximity of the wire end parts is avoided, something that occurs with connectors known in the prior art.
2. Wear is reduced in the area of the cutting wire connector, especially the drastic concave friction wear that occurs with clamping-type and threaded-sleeve connectors.
3. Personnel costs are decreased and the operating time of facilities is improved.
4. Increased cutting rate through increased feed speed and higher possible tensile forces of the wire.
5. Improved quality of the cut with less subsequent machining of the workpiece being necessary.
6. Transmission of torque along the wire axis, which can occur in an intentional or unintentional manner, for instance when the wire is preturned before the loop is closed, when the wire is rotated intentionally according to our patent application with the number A 2080/92, or when generated by various irregularities within the overall system consisting of machine, workpiece and tool.
7. Simple opening and connecting of the cutting wire tool.
8. Reduced wear in the connection area of the cutting wire due to very small construction lengths of the joint connectors, whereby the spacing of the cutting beads is enlarged only minimally.
9. Noise-free and smooth running of the cutting wire because the cutting wire connector is movable in all angles.
10. Possibility to reduce the roll or pulley diameters of the wire sawing machine, which will lead to improved handling and mobility and to the fact that the method will be used more frequently.
11. Increase of the overall economy of the wire sawing method.

List of terms used:
1. fork
2. intermediate part
3. joint pin
4. wire rope
5. elastic spacer
6. cutting bead
7. elastic filler material
8. screw bolt
9. sleeve
10. universal joint spider
11. universal joint—revolving part
12. universal joint—grooved straight pin
13. recess in the side of the fork (1)
14. groove
15. driving roll
16. deflection pulley
17. workpiece
18. cutting wire connector
19. side of the fork
20. joint axis
21. longitudinal axis of the cutting wire
D nominal diameter of cutting beads.
A distance between the joint axes in the intermediate part (2)

What is claimed is:

1. A cutting wire for use in a wire sawing machine for cutting metallic materials, mineral materials or materials that contain mineral substances, said cutting wire having several intertwined strands of metal wire and cutting beads containing bonded superabrasives and one or more connectors that permit the cutting wire to rotate while cutting, each of said connectors comprising an intermediate part, at least two joint pins and a pair of forks each affixed on one end to said intertwined strands of metal wire, said forks having two sides, said intermediate part being connected with said two sides of each of said forks by said joint pins, each of said joint pins having a joint axis extending along the length thereof, said joint axis of one of said joint pins extending at a right angle to the joint axis of the other of said joint pins.

2. A cutting wire as set forth in claim 1 wherein said cutting beads have a nominal cutting diameter and said joint axes are spaced a distance from each other, said distance being zero to three times the nominal cutting diameter of the cutting beads.

3. A cutting wire as set forth in claim 2 wherein the intertwined strands of metal wire have a longitudinal axis, and said joint axes each extend perpendicular to said longitudinal axis.

4. A cutting wire as set forth in claim 3 wherein said intermediate part comprises a universal joint spider.

5. A cutting wire as set forth in claim 1 or 2 wherein said sides of said forks each have a recess, and said joint pins comprise screw bolts having a threaded portion and a head, the threaded portion engaging the recess of one side of said forks and the head engaging the recess on the other side of said forks such that said intermediate part is freely movable.

6. A cutting wire as set forth in claim 1, 2 or 4 wherein said joint pins include one or more grooves for securing the position of said joint pins relative to said intermediate part.

7. A cutting wire as set forth in claim 1, 2 or 4 wherein said joint pins are fixed in said forks by means of a retaining pin, a Seeger retaining ring, a rivet, glue or a spot weld.

8. A cutting wire as set forth in claim 1, 2 or 4 wherein a sleeve is provided between said joint pins and said intermediate part.

* * * * *